Nov. 23, 1971   N. L. WILLMANN ET AL   3,621,543
METHOD OF FABRICATING BATTERY PLATE GRIDS
Filed April 6, 1970   2 Sheets-Sheet 1
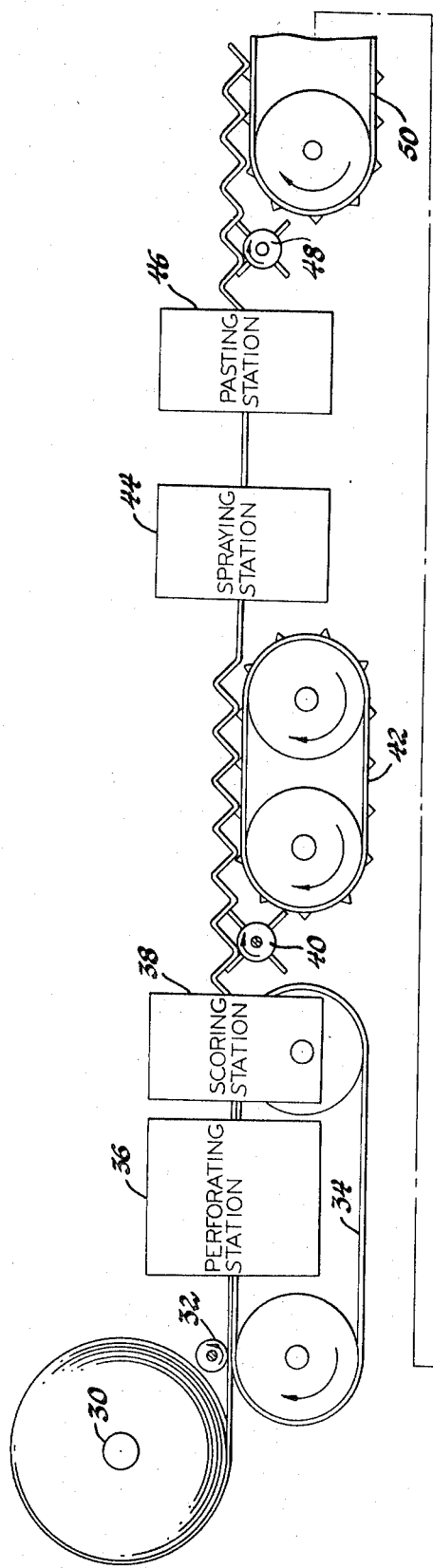
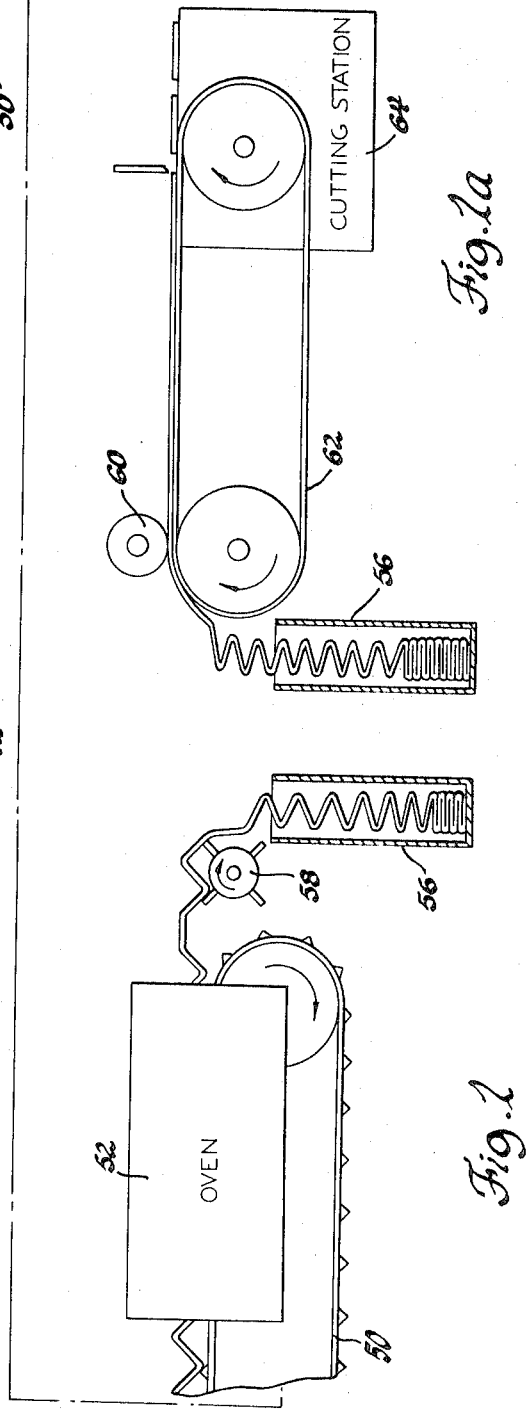
INVENTORS
Norman L. Willmann &
BY Ellis G. Wheadon
R. J. Wallace
ATTORNEY 3,621,543
METHOD OF FABRICATING BATTERY PLATE GRIDS Norman L. Willmann, Anderson, and Ellis G. Wheadon, Yorktown, Ind., assignors to General Motors Corporation, Detroit, Mich.
Filed Apr. 6, 1970, Ser. No. 25,630
Int. Cl. H01m 35/26
U.S. Cl. 29—2       3 Claims

ABSTRACT OF THE DISCLOSURE

A method is disclosed for fabricating battery plate grids from a continuously moving strip of material. One form of the method includes the steps of punching a plastic strip into successive grids interlinked by at least one connecting member, reducing the thickness of the interconnecting member to form an integral hinge portion thereon, and accumulating the strips prior to their entering an oven by folding them in an accordion-like manner at the integral hinge portions.

---

This invention relates to a method of fabricating battery plate grids and more particularly to a continuous method of fabricating plastic battery plate grids for lead-acid storage batteries.

The use of lightweight, hard polymer-type plastic materials as battery plate grids is known in the prior art. These grids generally function as a support for the active paste of the battery electrode. One disadvantage, heretofore, of fabricating this type of plastic battery plate grid by a continuous process has been the equipment size required. It is generally not desirable to accumulate or fold the grids in a random fashion as one could a homogeneous flexible material, such as a cloth fabric or the like. However, sufficient time must be allowed to adequately dry the pasted plates in an oven during a continuous moving process. Hence, such a continuous process generally requires a much larger, and more expensive oven and a longer conveyor system than that required for a comparable batch type of operation.

Moreover, the grids are usually coated with a conductive coating, such as sprayed metal, prior to pasting active materials thereon to provide a current collector distribution path. The grids include a plurality of thin rather delicate cross bars that provide a uniform current distribution path throughout the plate via the cross bars. If the grids are accumulated or bent in a random fashion, the conductive coating can crack, chip and spall out of the cross bar region; and the cross bars themselves can even be broken. This, of course, would deleteriously affect uniform current distribution in the finished plate. If the current distribution through the plate is uneven, a variety of problems can ensue that will seriously reduce the effective life of the plate.

Accordingly, it is an object of this invention to provide a method of fabricating battery plate grids out of plastic by a continuous process.

Another object of this inveniton is to provide a method of accumulating plastic battery grids in a continuous process without deleteriously affecting the grids.

Yet another object of this invention is to provide a method of fabricating plastic battery plate grids from a continuous plastic strip which allows the use of smaller sized equipment.

Still yet another object of this invention is to provide a method of continuously fabricating plastic battery grids which require a relatively short conveyor and oven.

These and other objects are accomplished by punching the individual grid units out of a continuous plastic strip with each grid connected to a successive adjacent grid by an interconnecting portion; reducing the thickness of the interconnecting portions to form integral hinge portions thereon; coating said grids with a conductive material, pasting said strip with an active electrolytic plate material; and folding said pasted strip into an accordion-like form prior to being dried in an oven.

FIGS. 1 and 1a are diagrammatic illustrations of steps used in accordance with the present invention;

Figure 2:
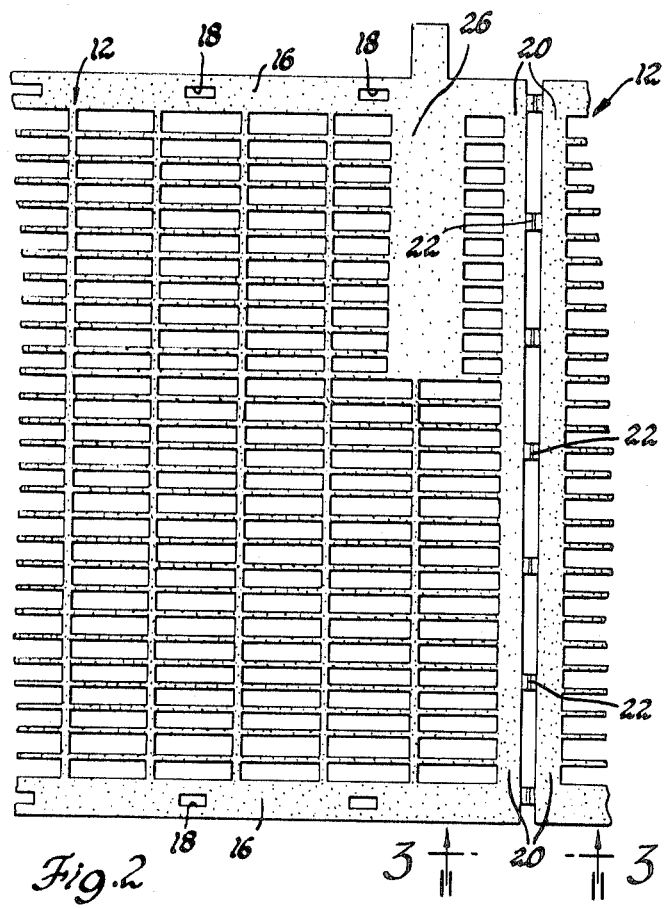
FIG. 2 is a partial plan view of a plastic battery plate grid fabricated in accordance with the present invention.
Figure 3:
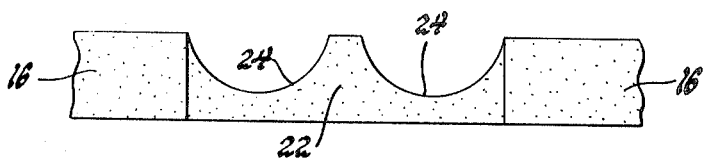
FIG. 3 is a sectional view taken along the lines 3—3 of FIG. 2.

Referring first to FIG. 2, it shows a plastic strip having grid units 12 suitable for use in a lead-acid storage battery which can be utilized in automotive applications, or the like. Each grid has transverse and longitudinal cross bars which intersect perpendicularly generally defining the paste receiving region of the grid. The periphery of each grid unit 12 includes a pair of longitudinal margins 16 having spaced apart index openings 18 and a pair of transverse margins 20. The transverse margins of each adjacent grid unit are connected by spaced apart ribbon-like interconnecting members 22. The ribbon-like interconnecting members 22 are scored, as is shown in FIG. 3, with grooves 24. The scored ribbon-like interconnecting members function as integral hinge portions whereat the strip may be folded as will subsequently be described. Adjacent each transverse margin is a solid generally rectangular area 26 which is suitable to receive a conventional battery lug or terminal, not shown, secured thereon by conventional means.

A preferred method of fabricating lead-acid storage battery plate grids from a continuous plastic strip will now be described in detail. Accordingly, referring to FIG. 1, it shows a sequence of operations beginning with a source of plastic strip on a reel 30. Any durable, hard and nonporous polymer plastic or the like can be used. For example, a polystyrene or a polypropylene type of plastic can be used. The plastic strip is shown urged by a pressure feed roller 32 onto the receiving end of a continuous conveyor 34. Conveyor 34 passes first through a punching station 36 and subsequently through a scoring station 38 located adjacent the delivery end of the conveyor. Station 36 contains means for punching the plastic strip into a plurality of successive spaced apart grid units having transverse margins, such as previously described, connected by the ribbon-like interconnecting members. The punching means can be a suitable configured punch which could reciprocate vertically with a frequency related to the speed of conveyor 34.

Scoring station 38 contains means for forming integral hinge portions on each ribbon-like interconnecting member. Scoring, as herein defined, refers to notching or removing material by a method, such as trenching or the like, which reduces the thickness of the member and thereby increases its flexibility. Any appropriately configured tool can be used. Of course, integral hinge portions of other types can be constructed. However, integral hinge portions formed by spaced apart grooves are preferred, such as is shown in FIG. 3, for this type of embodiment. Also, the hinge portion can be formed simultaneously with the punching operation if desired.

A folding wheel 40 is located intermediate the delivery end of conveyor 34 and the receiving end of a continuous conveyor 42. Folding wheel 40 has a plurality of projections which successively engage the strip, as the wheel is rotated, causing the strip to fold at the integral hinge portions. The folded strip forms an accordion-like shape on conveyor 42. Spaced apart upstanding studs on conveyor 42 maintain the folded strip in its accordion-like shape while on this conveyor. Of course, the amount that the plastic strip accumulates on conveyor 42 can be regulated by the relative speeds of folding wheel 40, conveyor 34, and conveyor 42. The spacing of the studs can be adjusted accordingly. It should be recognized that although the folded strip is herein described as held in its accordion-like shape by the upstanding studs, any suitable means including a corrugated belt can be used.

Adjacent the delivery end of conveyor 42 is a spraying station 44. Metal in the form of a spray can be deposited uniformly over each successive grid by conventional and well known flame spraying methods constituting no part of this invention. The spray can be any suitable conductive material. For example, a suitable material for a negative battery plate can be predominately lead. The lead could be deposited in a molten state from nozzles over and under the strip. It should be pointed out that the strip unfolds at the delivery end of conveyor 42 prior to entering spraying station 44.

Adjacent spraying station 44 is pasting station 46. Therein active electrolytic plate materials in paste form of suitable viscosity can be deposited on the unfolded conductively coated grids. Of course, the composition of the paste will depend upon the intended polarity of the particular battery plate. In any event, sufficient paste should be applied to overlie each grid on both sides with adequate pressure to force the paste into intimate contact with the cross bars of the grid.

Another folding wheel 48 is located intermediate station 46 and an oven conveyor 50. Wheel 48 also has a plurality of projections which successively engage the plastic strip as it leaves station 46 causing it to again fold at the integral hinge portions. The folded strip again forms an accordion-like shape on this conveyor. Spaced apart studs of conveyor 50 maintain the strip in its accordion-like shape. Conveyor 50 passes through an oven 52 which contains heat generating means. For example, a plurality of electrical heating units can be used. The pasted strip passes through oven 52 in an accumulated fashion. The oven is maintained at a temperature sufficient to bond the paste uniformly onto the grid. It should be pointed out that the amount of oven time allotted each pasted unit is related to the speed of conveyor 50 and the length of the furnace. By way of example, one type of storage battery plate grid which can be used has a length of about 5.8 inches. When accumulated on a conveyor belt system having studs spaced apart about two inches, 90 such units could be contained in a 90-inch oven. A conveyor speed of about 1.5 inches per minute could then process about 90 units per minute therethrough.

Continuing, intermediate the outlet end of oven 52 and a curing bin 56 is a third folding wheel 58 which tends to maintain the accumulated shape of the pasted strip as it is stored in bin 56. Wheel 58 has projections which successively engage the pasted strip as it enters the bin. The strip is stored in bin 56 in a compressed accordion-like shape. The completed strip can of course be removed from the curing bin as desired, as is illustrated in FIG. 1a. A pressure roller 60 can guide the strip onto a conveyor 62 which passes through a cutting station 64. Station 64 contains means for separating the individual plate units. For example, a vertically reciprocable blade having a frequency proportional to the linear speed of conveyor 62 could be used. It should be noted that the strip could feed directly into cutting station 64 from the oven when conditions demand.

We claim:

1. A continuous method of fabricating lead-acid storage battery plates from a moving plastic strip which comprises the steps of
punching a moving plastic strip to form a plurality of successive grids therein each of which is connected to an adjacent grid by at least one interconnecting member,
reducing the thickness of said interconnecting member between each of said successive grids to increase the flexibility of said member to form an integral hinge portion between adjacent grids,
coating said grids with a conductive material,
pasting said strip with an active electrolytic plate material,
folding said pasted strip at the integral hinge portion, and
heating said strip while folded in said accordion-like fashion.

2. A continuous method of fabricating lead-acid storage battery plates from a moving plastic strip which comprises the steps of
punching a moving plastic strip to form a plurality of successive grids therein, each of which is connected to an adjacent grid by ribbon-like interconnecting members,
reducing the thickness of said ribbon-like interconnecting members to increase the flexibility of said members to form integral hinge portions between adjacent grids,
folding said strip a first time in an accordion-like fashion prior to transporting said strip to a spraying station,
allowing said strip to unfold prior to entering said spraying station,
spraying said unfolded strip with a conductive material,
pasting said strip with an active electrolytic plate material,
folding said pasted strip a second time in an accordion-like fashion prior to transporting said strip to an oven, and
heating said folded strip in said oven.

3. A continuous method of fabricating lead-acid storage battery plates from a moving plastic strip which comprises the steps of
punching a moving plastic strip to form a plurality of successive grids therein each of which is connected to an adjacent grid by ribbon-like interconnecting members,
scoring said ribbon-like interconnecting members to increase the flexibility of said members thereby forming integral hinge portions between adjacent grids,
folding said strip a first time in an accordion-like fashion prior to said strip being conveyed to a spraying station,
allowing said strip to unfold prior to entering the spraying station,
spraying said strip with lead,
pasting said strip with an active electrolytic plate material,
folding said strip a second time in an accordion-like fashion prior to said strip being conveyed to an oven,
heating said strip in said oven,
storing said strip in a compressed accordion-like fold in a curing bin, and severing said interconnecting members of said strip to separate said grids after removal from said curing bin.

References Cited

UNITED STATES PATENTS

| | | | |
|---|---|---|---|
| 2,716,146 | 8/1955 | Raney | 136—36 |
| 2,955,146 | 10/1960 | Vogt | 136—67 X |
| 3,248,266 | 4/1966 | Rampel | 136—67 X |
| 3,272,654 | 9/1966 | Lang | 136—67 |
| 3,310,438 | 3/1967 | Huffman et al. | 136—36 |
| 3,516,864 | 6/1970 | Willmann | 136—36 X |

FOREIGN PATENTS

| | | | |
|---|---|---|---|
| 753,755 | 8/1956 | Great Britain | 29—2 |
| 1,039,194 | 8/1966 | Great Britain | 136—67 |

R. SPENCER ANNEAR, Primary Examiner

U.S. Cl. X.R.

29—592; 136—36